US012121929B2

(12) United States Patent
Batllo et al.

(10) Patent No.: US 12,121,929 B2
(45) Date of Patent: Oct. 22, 2024

(54) DEVICE FOR APPLYING A PRODUCT, MACHINE INCLUDING SUCH A DEVICE AND METHOD FOR CONTROLLING SUCH A MACHINE

(71) Applicant: EXEL INDUSTRIES, Epernay (FR)

(72) Inventors: Benoit Batllo, Paris (FR); Stéphane Robert, Paris (FR)

(73) Assignee: EXEL INDUSTRIES, Epernay (FR)

( * ) Notice: Subject to any disclaimer, the term of this patent is extended or adjusted under 35 U.S.C. 154(b) by 498 days.

(21) Appl. No.: 17/464,668

(22) Filed: Sep. 1, 2021

(65) Prior Publication Data

US 2022/0072579 A1 Mar. 10, 2022

(30) Foreign Application Priority Data

Sep. 7, 2020 (FR) ....................................... 2009063

(51) Int. Cl.
*B05C 5/02* (2006.01)
*B05C 11/00* (2006.01)

(52) U.S. Cl.
CPC ............ *B05C 5/0212* (2013.01); *B05C 11/00* (2013.01)

(58) Field of Classification Search
None
See application file for complete search history.

(56) References Cited

U.S. PATENT DOCUMENTS 10,471,461 B2 * 11/2019 Ganzer ................. B05C 5/0225
10,814,345 B2 * 10/2020 Hidaka ................. B05C 5/0258
11,433,418 B2 * 9/2022 Gould ....................... F24H 1/10
11,478,813 B2 * 10/2022 Yamanaka ................ B05C 1/02
11,654,450 B2 * 5/2023 Oda ...................... B05C 5/0208 118/300
2023/0110347 A1 * 4/2023 Takada .................. B29C 44/461 239/8

OTHER PUBLICATIONS

INPI Rapport de Recherche Preliminaire for Patent Application No. FR 2009063, Jun. 10, 2021, 2 pp.

* cited by examiner

*Primary Examiner* — Jethro M. Pence
(74) *Attorney, Agent, or Firm* — Soquel Group LLC

(57) ABSTRACT

Device for applying a product, including a frame in which a product conduit is provided, the frame defining a longitudinal bore, the device including a needle mounted in the longitudinal bore, the device including a product application valve formed by a nozzle provided on the frame and a shutter provided at an end of the needle in the product conduit. The needle is configured to be moved along a longitudinal axis between a closed position and an open position of the dispensing valve. The device includes a stop fixed in relation to the needle, and a stop fixed in relation to the frame, configured to limit the return of the needle towards its closed position to an intermediate position between the closed and the open position, by interaction with the stop fixed in relation to the needle, and the stop fixed in relation to the frame has an adjustable position.

3 Claims, 11 Drawing Sheets

DEVICE FOR APPLYING A PRODUCT, MACHINE INCLUDING SUCH A DEVICE AND METHOD FOR CONTROLLING SUCH A MACHINE

CROSS-REFERENCE TO RELATED APPLICATION

This application claims priority of French Patent Application No. 2009063, filed on Sep. 7, 2020.

FIELD OF THE INVENTION

The present invention relates to a device for applying a product, a machine comprising such a device and method for controlling such a machine.

BACKGROUND OF THE INVENTION

In the field of application of adhesive or sealant products by robotic systems, it may be necessary to modify the application rate rapidly in order to obtain a wider or narrower adhesive or sealant bead, for example. This width modification must be quick, to ensure clean results and avoid costly product waste. Since these products are viscous, systems must be designed specifically for them.

Electrically operated product dosing or pressure control systems are driven by motors. In the case of applications that are less dynamic and close to the dosing system, the motor speed is proportional to the product output. In the case of applications that are more dynamic or when the application is far from the dosing system, the dosing or pressure control systems have relatively long reaction times, due to the compressibility of the products, the elasticity of the hoses and the high pressures involved. To achieve fast flow changes, it is known to use mechanical systems creating adjustable restrictions before the product application nozzles, with moving parts. Such solutions have several disadvantages:

- It is not possible to stop the product application quickly, due to the volume to be decompressed between the restriction and the nozzle. The end of the bead applied is therefore not clean.
- The products are abrasive and cause wear on the moving parts and leakage.
- The actuators needed to move the moving parts must be fast and powerful and are therefore expensive.
- Special seals must be designed for all moving parts, which adds cost.
- The needle and the valve seat must be specifically designed, which does not allow the use of a pre-existing, non-variable flow application device.

SUMMARY OF THE DESCRIPTION

The objective of the invention is to propose a new product application device, allowing fast variations of product application rate to be obtained, with mechanical parts whose cost and complexity are low compared to existing solutions, better performances and better reliability.

To this end, the invention relates to a product application device, comprising a frame in which a product conduit is provided, the frame defining a longitudinal bore, the application device including a needle mounted in the longitudinal bore, the application device including a product application valve formed by a nozzle provided on the frame and a shutter provided at an end of the needle located in the product conduit, the needle being configured to be moved along a longitudinal axis between a closed position of the application valve and an open position. This application device is characterized in that it includes a stop fixed in relation to the needle, and a stop fixed in relation to the frame configured to limit the return of the needle towards its closed position to an intermediate position between the closed position and the open position, by interaction with the stop fixed in relation to the needle, and in that the stop fixed in relation to the frame has an adjustable position.

By means of the invention, the positioning of the needle in intermediate positions makes it possible to create an adjustable restriction that does not require expensive actuators or specific sealing solution designs.

According to advantageous but non-mandatory aspects of the invention, such a product application device may incorporate one or more of the following features, taken in any technically permissible combinations:

The stop fixed in relation to the frame is formed by at least one cam, and the application device includes an actuator for adjusting the position of the cam.

The position of the cam is adjustable in rotation about an adjustment axis perpendicular to the longitudinal axis of the needle, and the profile of the cam describes a surface of increasing radius.

The position of the cam is rotationally adjustable about an adjustment axis parallel to the longitudinal axis of the needle, and the thickness of the cam increases about the adjustment axis.

The adjustment actuator is a rotary electric motor.

The cam is carried by a tubular part mounted around a part of the needle projecting from the frame, the actuator is a hollow shaft motor driving the tubular part, the angular position of the cam being adjustable around the longitudinal axis of the needle, and the thickness of the cam is increasing around the adjustment axis.

The stop fixed in relation to the needle is attached to an end of the needle projecting from the frame.

The adjustment actuator, the needle stop, and the frame stop form an external assembly configured to be attached and connected to the frame and needle of an existing application device.

The stop fixed in relation to the needle is formed by a piston housed in a pilot chamber of the frame, and the frame stop is provided in the frame and projects into the pilot chamber.

The stop fixed in relation to the needle has an inclined surface with respect to the longitudinal axis of the needle.

The stop fixed in relation to the frame is formed by a part that may be moved in translation along an axis parallel to the longitudinal axis of the needle, and the application device includes a linear actuator for adjusting the position of the part that can be moved in translation.

The invention also relates to a product application machine including an application device as mentioned above, and an dosing system for the product, the dosing system being configured to send the product with an adjustable pressure into the application device, the dosing system including a motor whose speed is controlled to adjust the pressure and a control unit configured to control the dosing system and the application device.

The invention also relates to a method for controlling a product application machine as mentioned above, characterized in that it includes at least one of the following operations, implemented by the control unit:

a) in the event of a request to increase a nozzle output flow rate of the application device between a lower value and an upper value, generating an increase in output pressure of the dosing system by maintaining the motor speed of the dosing system at a constant value and reducing the opening of the needle valve of the application device, then reopening the needle valve and increasing the motor speed up to the value necessary to obtain the upper value of output flow rate;

b) in the event of a request to decrease the output flow rate from the upper value to the lower value or to an intermediate value between the lower and upper value, generating a reduction in output pressure of the dosing system by reducing the motor speed to a low value, and reducing the opening of the needle valve of the application device, then reopening the needle valve and increasing the motor speed to the value necessary to achieve the intermediate or lower output flow rate value.

According to advantageous but non-mandatory aspects of the invention, such a control method may incorporate one or more of the following features, taken in any technically permissible combinations:

In operations a) and b), the reduction of the opening of the needle valve of the application device is achieved by positioning the stop fixed in relation to the frame at a predefined position during an output flow control phase, and then closing the needle valve to the predefined position by positioning the stop fixed in relation to the frame.

In step b), the low value to which the motor speed is reduced is less than zero, the motor direction being reversed.

BRIEF DESCRIPTION OF THE DRAWINGS

The invention will be better understood and other advantages thereof will become clearer in the light of the following description of a product application device, a product application machine and a control method according to its principle, made by way of non-limiting example with reference to the appended drawings, in which.

DETAILED DESCRIPTION

Figure 1:
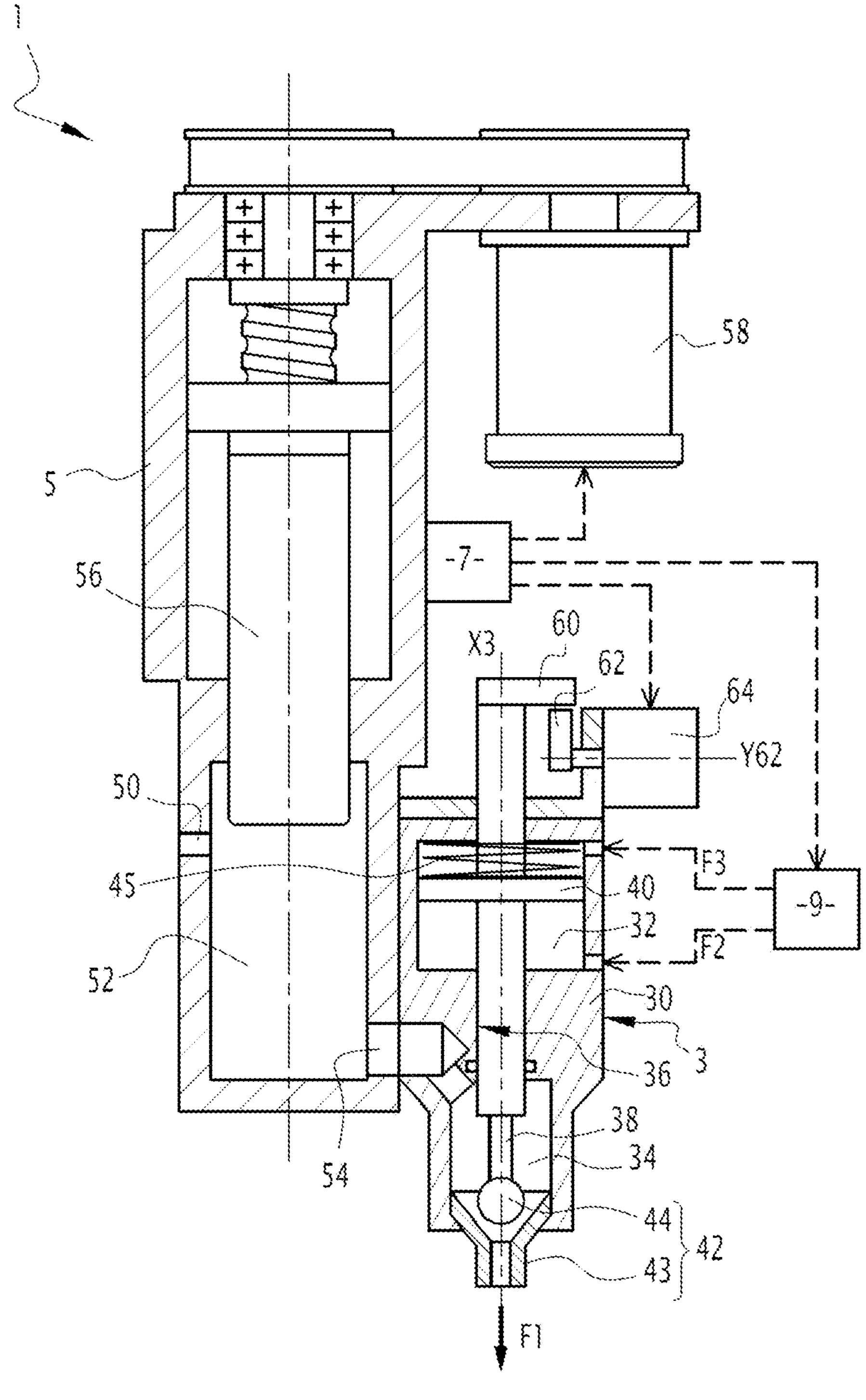
FIG. 1 is a schematic cross-section of a product application machine according to the invention, showing a product application device according to a first embodiment of the invention, the product application device being in an open configuration.

FIG. 1 shows an application machine 1 for products, particularly high viscosity products such as adhesives or sealants (mastic, etc.). Machine 1 includes a product application device 3, and a product dosing system 5 fed by a product source to be applied (not shown).

Dosing system 5 includes a product input port 50, a product dosage chamber 52, and a product outlet port 54 to application device 3. Dosing system 5 includes a dosing piston 56, and a motor 58 actuating the movement of dosing piston 56 in chamber 52 via a mechanical motion transformation system (e.g., a ball screw).

Dosing system 5 is configured to send the product into application device 3 with an adjustable pressure. The speed and torque of motor 58 are controlled to adjust the speed of movement of dosage piston 56, and the pressure of the product output from output port 54.

Application machine 1 includes a control unit 7, configured to control dosing system 5 and application device 3. For this purpose, control unit 7 may be equipped with microprocessors, memories, calculator and communication systems configured to control dosing system 5 and application device 3 by electrical signals.

Application device 3 includes a frame 30, in which a control chamber 32 and a product conduit 34 are provided. Frame 30 defines a longitudinal bore 36, centered about a central axis X3, which extends longitudinally through frame 30 through pilot chamber 32 and into conduit 34. Application device 3 includes a needle 38 slidably mounted in longitudinal bore 36. Application device 3 also includes a piston 40 housed in control chamber 32 and fixed in relation to needle 38 as it slides along axis X3.

Application device 3 includes a needle application valve 42 formed by a nozzle 43 provided on frame 30, and a shutter 44 provided at an end of needle 38 located in conduit 34. Product conduit 34 guides the product between outlet port 54 and nozzle 43. The product is applied as it exits nozzle 43 along arrow F1. Shutter 44 is formed by a ball in this example, but may be any other shape, including a cone, etc.

Figure 3:
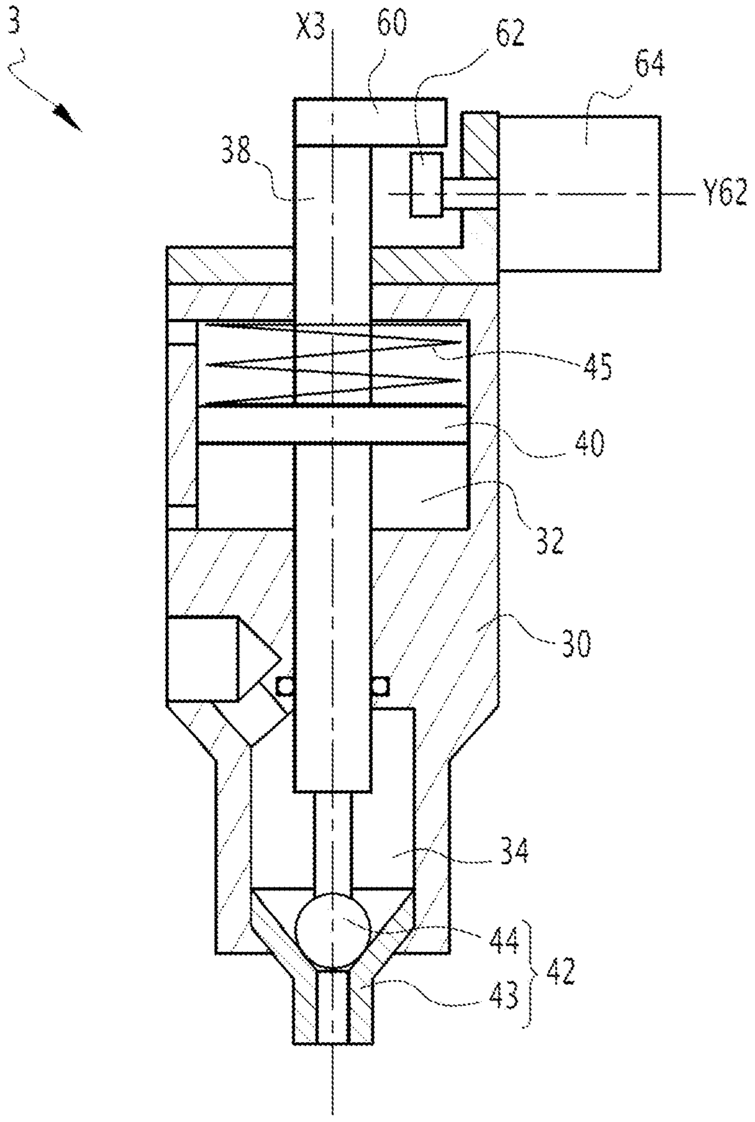
FIG. 3 is a schematic cross-sectional view of the product application device of FIG. 1 in a closed configuration.

Needle 38 moves along longitudinal axis X3 between a closed position of needle valve 42, shown in FIG. 3, and an open position shown in FIG. 1, under the action of a pilot fluid injected into pilot chamber 32. Application device 3 includes an elastic return element for needle 38 in the closed position, formed by a spiral spring 45 for example, housed in control chamber 32. When a control fluid is injected into control chamber 32 along arrow F2, needle 38 is directed towards its open position against the force of spring 45. A pilot fluid may also be injected into pilot chamber 32 along arrow F3, to direct needle 38 to its closed position. The control fluid may be compressed air.

In an alternative embodiment not shown, needle 38 returns to its closed position under the sole action of spring 45.

Application device 3 includes a stop 60 fixed in relation to needle 38, and a stop 62 fixed in relation to frame 30 configured to limit the return of needle 38 towards its closed position to an intermediate position between the closed position and the open position, by interaction with stop 60 fixed in relation to needle 38. Stop 60 is fixed in relation to needle 38 as it slides along longitudinal axis X3. Stop 62 fixed in relation to frame 30 has an adjustable position, that is, its position along longitudinal axis X3 is fixed with respect to needle 38, except at an interval to adjust its position along longitudinal axis X3. Adjusting stop 62 prevents needle valve 42 from closing completely, and thus reducing the flow of product out of nozzle 43.

Figure 2:
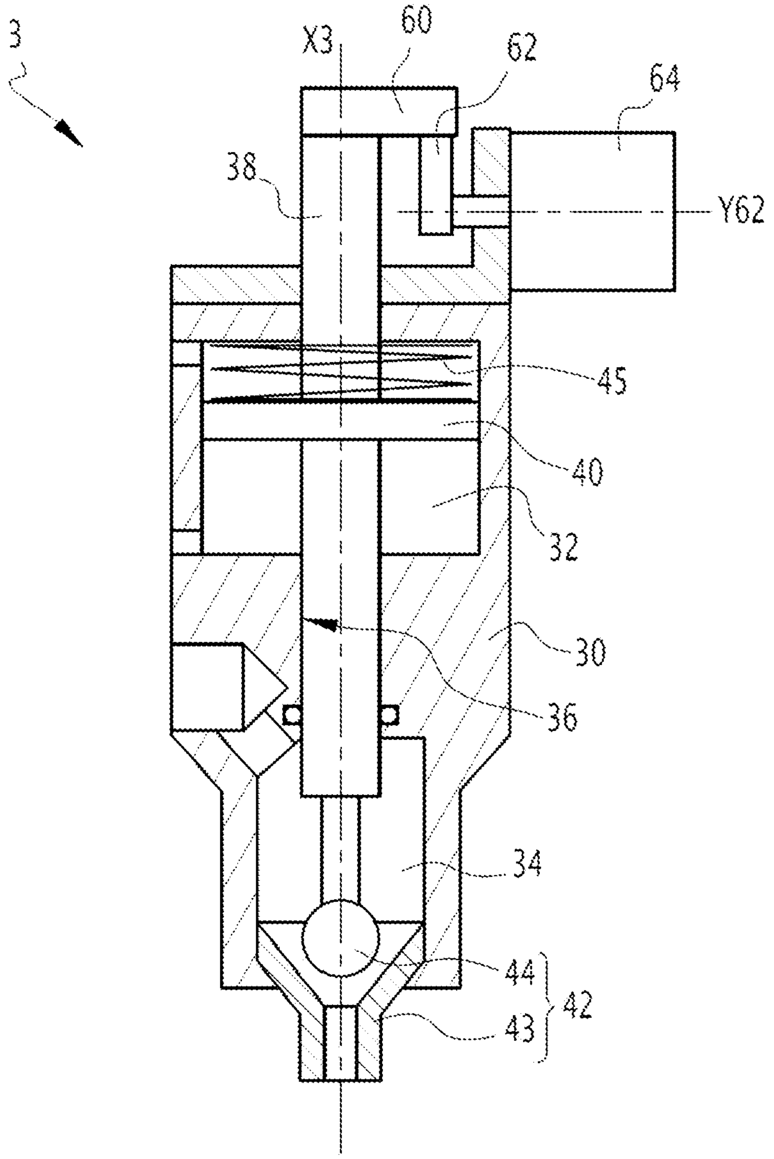
FIG. 2 is a schematic cross-section of the product application device of FIG. 1 in an intermediate configuration.

In FIG. 1, stop 62 is set in the up position, and needle 38 is also in the up position with needle valve 42 fully open. Stops 60 and 62 are not in contact. In FIG. 2, stop 60 is in contact with stop 62 in an intermediate position, which limits the return of needle 38 to the down position to an intermediate position, so that needle valve 42 is not fully closed, and thus the flow is restricted. In FIG. 3, stop 62 is set to the down position. This allows needle valve 38 to return completely to the down position, as stop 62 no longer forms an obstacle to the descent of stop 60 along axis X3. Needle valve 42 is then completely closed.

Figure 4:
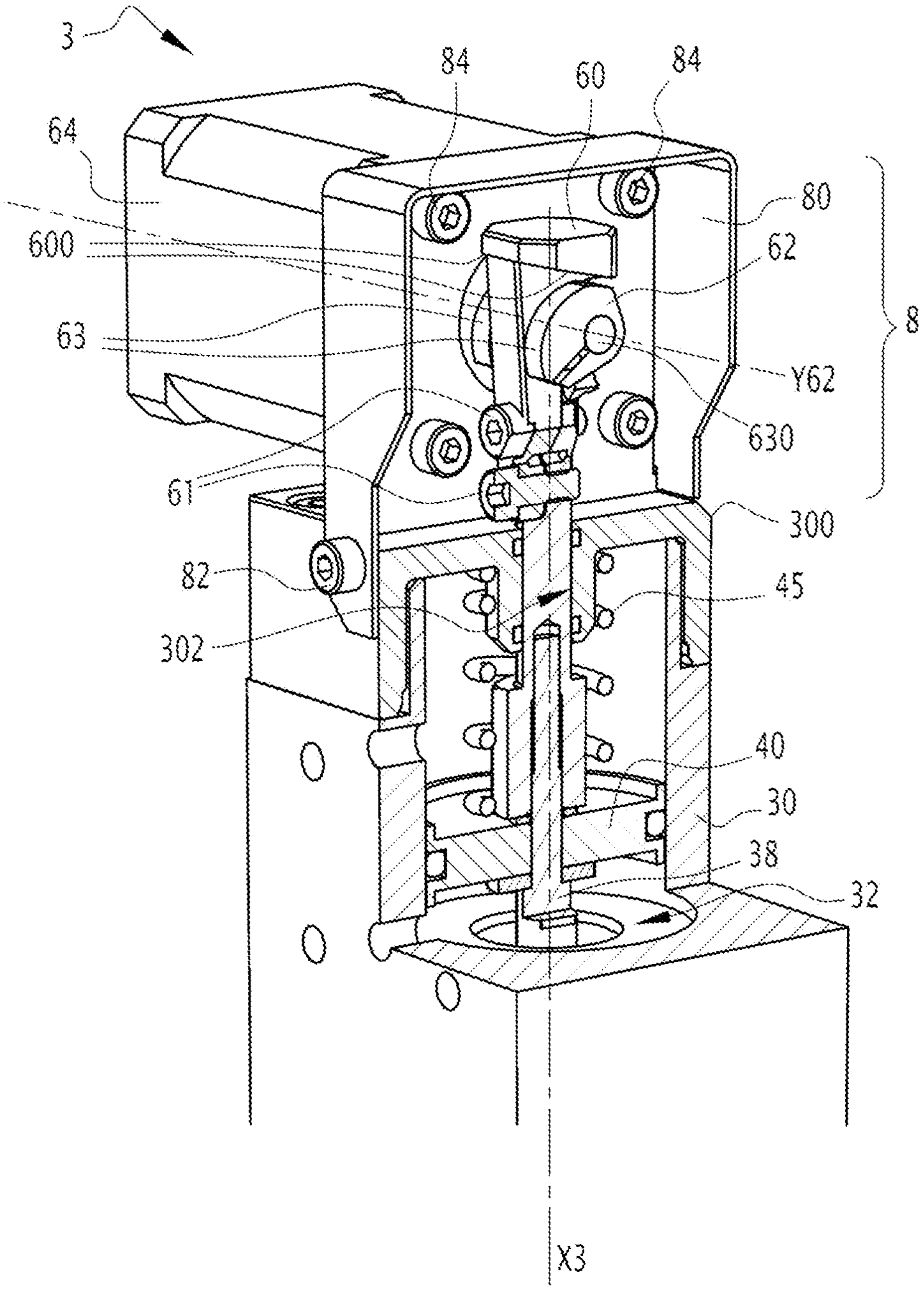
FIG. 4 is a partially sectioned perspective view of the application device of FIG. 1, showing the stop in a low configuration, in a closed configuration of the device.
Figure 5:
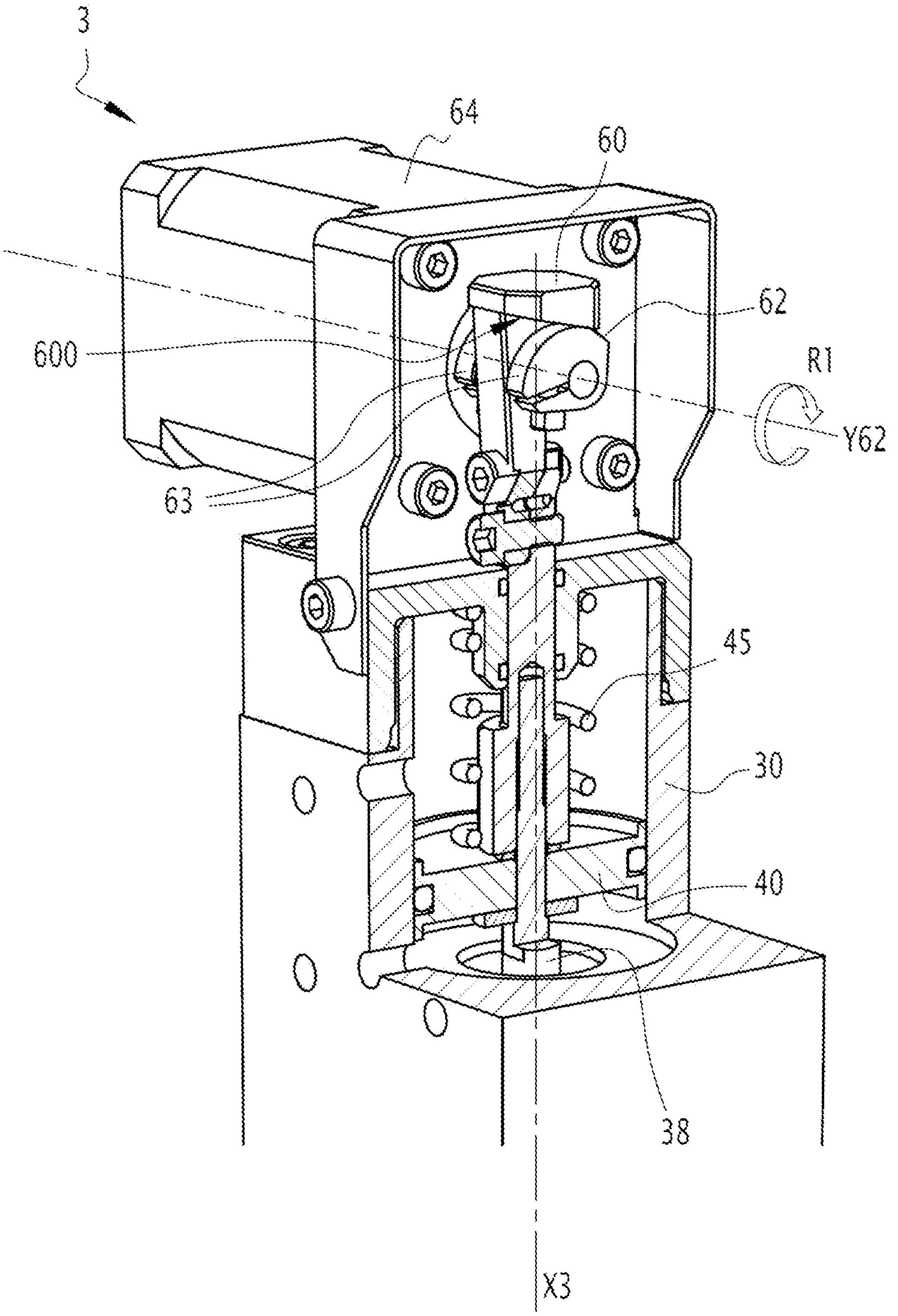
FIG. 5 is a partially sectioned perspective view of the application device of FIG. 1, showing the stop in an intermediate configuration.
Figure 6:
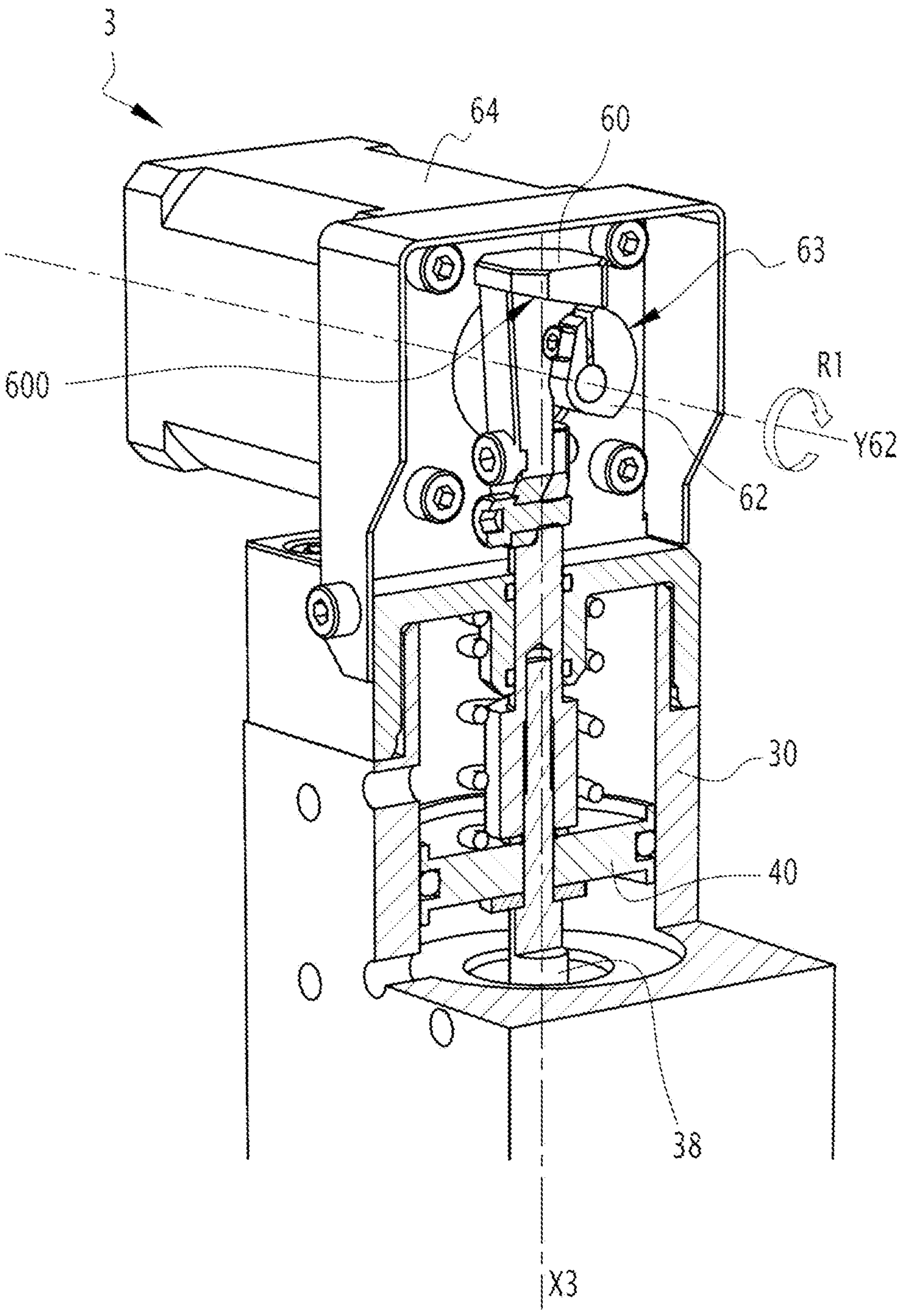
FIG. 6 is a partially sectioned perspective view of the application device of FIG. 1, showing the stop in a maximum opening configuration.

According to an embodiment shown in FIGS. 4-6, stop 60 is fixed to an end of needle 38 projecting out of frame 30, this end being opposite shutter 44. Frame 30 includes an upper cover 300, pierced by an opening 302 through which needle 38 slides along the longitudinal axis X3. Stop 60 is fixed to needle 38 by two screws 61, for example.

Application device 3 includes an actuator 64 for adjusting the position of stop 62. According to one embodiment, stop 62 is formed by at least one cam 63 that is rotatable about an axis of rotation Y62 perpendicular to longitudinal axis X3. Actuator 64 in this case is formed by an electric motor driving cam 63 in rotation about axis Y62. The rotation of cam 63 around axis Y62 allows the angular position of cam 63 to be adjusted and the positioning along axis X3 of stop 62 to be modified. The electric motor may be a stepper motor.

As can be seen in FIGS. 4-6, stop 62 may include two parallel cams 63, mounted on a common shaft 630 aligned with adjustment axis Y62.

According to one embodiment, stop 60 has a surface 600 for contact with stop 62 that is inclined with respect to longitudinal axis X3. Inclined surface 600 allows the height of stop 62 to vary along longitudinal axis X3 based on the angular position of cam 63, to be as constant as possible, with the stop of improving the precision and simplicity of control of cam 63 by actuator 64. This also ensures that the point of contact between cam 63 and inclined surface 600 is as close as possible to longitudinal axis X3, while avoiding the design of a specific stop surface.

In a variant, not shown, surface 600 may be perpendicular to longitudinal axis X3.

Stop 60 has two parallel inclined surfaces 600 each interacting with one of cams 63.

Cam 63 describes a curved surface of increasing radius about axis Y62. The angular position of cam 63 about axis Y62 varies the axial position, along axis X3, of stop 62, and the intermediate position at which the return of needle 38 to its closed position is limited.

In FIG. 4, cams 63 are in a low position, that is, an angular position in which they form a low obstacle, which does not oppose descent of stop 60. Needle 38 may therefore be in its closed position.

In FIG. 5, cams 63 are in an intermediate position corresponding to an angular position in which the surface radius of the cam aligned with axis X3 is larger. Cams 63 form an obstacle located higher along longitudinal axis X3 compared to FIG. 4. Between FIG. 4 and FIG. 5, cams 63 have been rotated according to arrow R1 in FIG. 5. In this position of cams 63, stop 60 is halted at a higher position, preventing needle valve 42 from closing again and creating a restriction in flow at nozzle 43.

In FIG. 6, cams 63 have been positioned at an angular position in which the surface radius of the cam aligned with axis X3 is maximum. Rotation of cams 63 along axis Y62 is continued along arrow R1. In this position, stop 62 keeps stop 60 in a high position, in which needle valve 42 is opened to its maximum.

According to one embodiment, actuator 64, stop 60, and stop 62 form an external assembly 8, configured to be attached and connected to frame 30 and needle 38 of an existing application device 3. Assembly 8 includes a cover 80 that encloses stop 60 and stop 62, and is attached to top cover 300, by screws 82 for example. Actuator 64 is attached to cover 80, by screws 84, for example. In the form of external assembly 8, stops 60 and 62 and actuator 64 may be easily adapted to an existing application device, the only limit being external access to needle 38. This access is limited little compared to the specific engineering solutions required to ensure sealing, needle valve modification, and actuator power in the case of the current solutions mentioned above.

Figure 7:
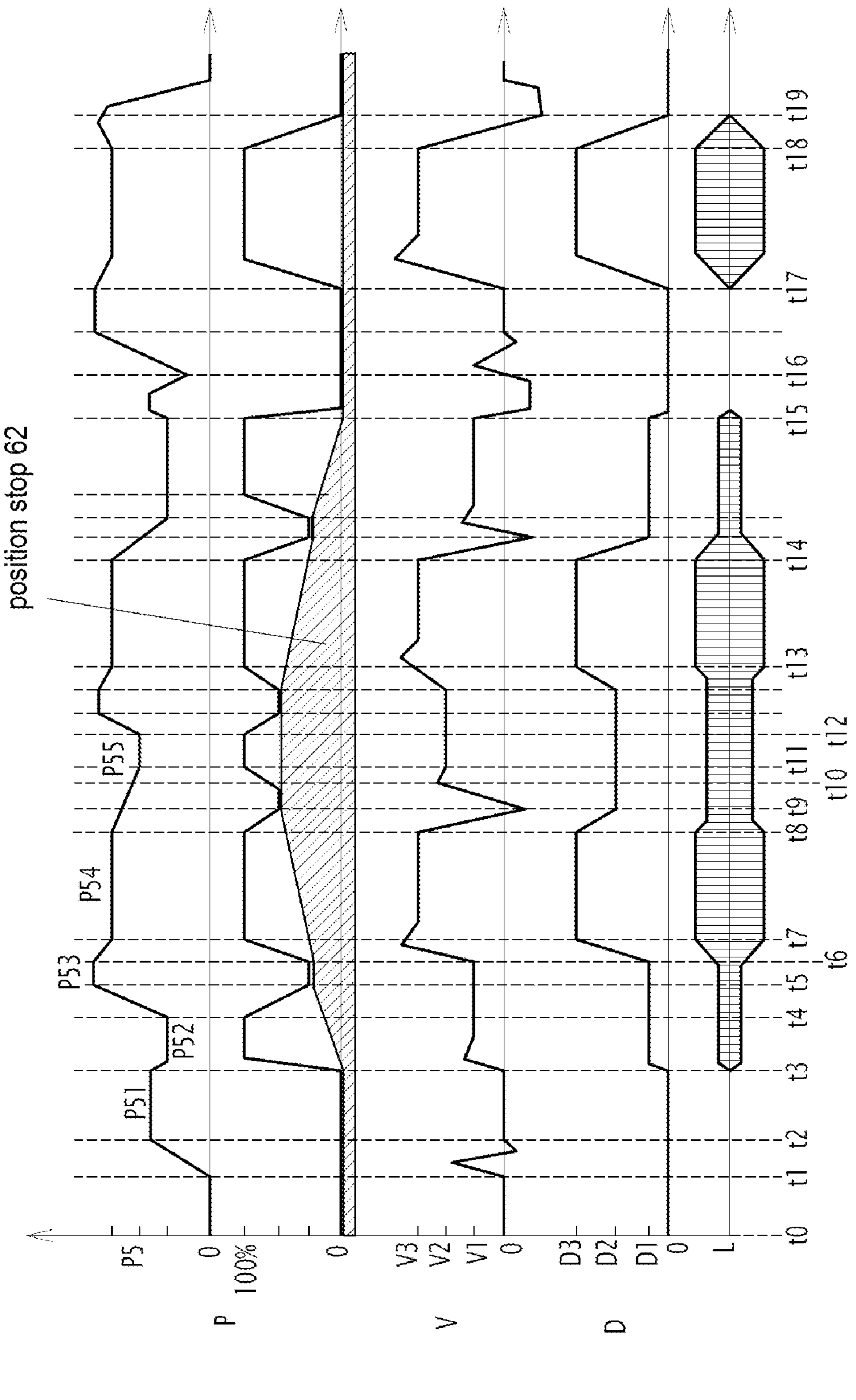
FIG. 7 is a flow chart of a method of controlling an application machine according to the invention.

The operation of machine 1 is described with reference to FIG. 7.

FIG. 1 shows the time on the x-axis, and, bottom to top, on the y-axis:

- The width L of the product bead deposited by application device 3;
- The output flow rate D of nozzle 43;
- The angular velocity V of motor 58 showing the linear velocity of piston 56;
- The position P of needle 38, with, in the form of a hatched area, the position of stop 62 fixed in relation to frame 30;
- The pressure relative to the atmospheric pressure P5 of the product present at the outlet of dosing system 5.

At a time t0, corresponding to the switching on of machine 1, for example, output flow rate D, speed V and pressure P5 are zero, and needle 38 is in the closed position. Stop 62 is in its position of FIGS. 3 and 4, that is, it does not prevent needle 38 from returning to the closed position.

To obtain a first product bead, it is necessary to have a certain pressure P5 in application device 3 slightly higher than the desired application pressure after opening needle valve 42. An initial pre-charge is therefore applied. This pre-charge is obtained by rapidly activating motor 58. The speed V is thus increased at a time t1, then returns to zero at a time t2, needle valve 38 remaining in position and needle valve 42 remaining closed in order to obtain a pressure P51.

At a time t3, product deposit begins: needle 38 is moved, to open needle valve 42 to 100%. The speed V is increased, to generate a constant product pressure P52, and an output flow rate D1 corresponding to a fraction of a maximum value D3 of the output flow rate D, 10% for example. Stop 62 remains in the lowered position.

Stops 60 and 62 are implemented in transient phases of the operation of machine 1, when an increase or decrease in the output flow rate from nozzle 43 must be obtained.

A request to increase output flow rate D at a time t6 is required. The flow rate must be increased quickly between D1 and D3. For this purpose, in advance of time t6, an increase in output pressure P5 is generated by keeping velocity V at a constant value V1 and reducing the opening of needle valve 42. For this, stop 62 is moved progressively to a predefined position, while machine 1 regulates the output flow rate D to the value D1. Positioning of stop 62 starts at t3. The predefined position of stop 62 may correspond to a small opening of needle valve 42, for example, 10% of the maximum opening.

At a time t4, closing of needle valve 42 is initiated. At a time t5, stop 62 has reached its predefined position, and needle valve 38 reaches the position predefined by positioning of stop 62. A restriction in flow at nozzle 43 is thus formed. With velocity V held constant at V1, this has the effect of increasing pressure P5 to a value P53 at time t5. Obtaining a higher flow rate requires a second pre-charge, while keeping the output flow rate D constant.

At time t6, with the required pressure P53 having been obtained, needle valve 42 is again opened to 100%. Speed V is increased to a maximum value V3 to reach the value necessary to obtain output flow D3. At a time t7, needle valve 42 is 100% open, velocity V3 is obtained, pressure P5 has decreased to a value P54 due to the opening of needle valve 42, and flow D3 is obtained. The time for obtaining the increase in output flow rate D, between times t6 (opening of needle valve 42) and t7 (obtaining flow D3), is short of the order of a few ms, for example, which makes it possible to have a net increase in bead width. If such a speed were to be obtained with actuators controlling a mechanical restriction at nozzle 43, these would then have to be very powerful and expensive.

Conversely, positioning of stop 62 may be done in hidden time during a normal control phase. It is therefore not necessary to provide a powerful actuator for its movement. Between time t3 and time t6, a few tens of ms may be sufficient to position stop 62. This is a changeover time that remains compatible with a standard, inexpensive stepper motor, which may therefore be used for actuator 64.

A transient phase of decreasing output flow rate D is now described. Output flow rate D must be decreased to an intermediate value D2 lower than D3, for example 20% of flow rate D3. For this purpose, control unit 7 generates a reduction in output pressure P5. This pressure reduction is fast: the speed V is quickly reduced to a low value. For example, the velocity V is reduced to the low value in a few ms. Reduction of speed V starts at a time t8 and ends at a time t9. The low value to which the speed V is reduced may be less than zero, as shown at time t9 in FIG. 7, so that the direction of travel of motor 58 may be reversed, in cases where a large flow reduction is desired. In a variant, the low value may be zero, or a speed less than 10% of the maximum value of the speed V for example, such as when the desired flow variation is less abrupt.

Simultaneously, opening of needle valve 42 is reduced. This reduction in opening is achieved by positioning stop 62 at a predefined intermediate position corresponding to 20% of the total opening of needle valve 42, for example, and by closing needle valve 42 at a time t8 by moving needle 38 towards the closed position until it is blocked by stop 62 at the predefined 20% position, at time t9. The start of positioning stop 62 takes place before time t8, and may be started from the 10% open position for example, at time t6, so that actuator 64 has enough time to position stop 62. In this way, a rapid reduction of output flow rate D is achieved. Then a normal regulation phase of output flow D begins, at value D2. For this purpose, needle valve 42 is opened again at a time t10, and speed V is increased again from time t9 to a value V2 necessary to obtain the output flow D2. At a time t11, velocity V is stabilized, pressure P5 is stabilized at a value P55, and needle 38 is positioned at its 100% open position.

Between times t12 and t13, control unit 7 again performs the steps already described to increase output flow D between D1 and D3: in order to restore output flow D at D3, speed V is kept constant, and pressure P5 is increased again to value P53 by partially closing needle valve 42, up to the intermediate opening value set by the positioning of stop 62, which has remained in place. At t13, a normal control phase is established with output flow D at D3.

At later times, t14 and t15, rapid reductions in speed V and partial closures of needle valve 42 are again carried out in order to successively reduce output flow D to D1 and then to zero. At time t13, or slightly earlier, stop 62 has progressively been lowered to set a stop position of needle valve 38 at t14, corresponding to opening needle valve 42 slightly, for example 10%. After time t14, stop 62 has progressively been lowered to its lowered position to allow needle valve 42 to close completely at t15, and the product bead to end. At time t15, velocity V is abruptly reduced to a negative value, which is equivalent to withdrawing piston 56 upward, to achieve a rapid decompression in conduit 34 of application device 3.

The control method may then be resumed as it was started at to, by a new pre-charge by increasing speed V at t16. A new product bead may then be deposited, with output rate D3, at t17. At a time t18, speed V is abruptly reversed, to obtain a rapid decompression and the end of the product bead at t19. Since there are no variations in output rate D between intermediate values between t17 and t19, stop 62 is not used in this phase. Application device 3 equipped with stops 60 and 62 may therefore be operated in a conventional way.

All of the operating steps described above are triggered at control unit 7 by control signals sent to motor 58, to a control fluid distributor 9 controlling the movement of needle 38, for example a pneumatic distributor, and to actuator 64.

The invention provides the following advantages:

- Full closures of needle valve 42 are rapid when stop 62 is in the down position, and there is no creation of dead product volume between upstream of nozzle 43 and nozzle 43. The ends of the product beads are therefore clean.
- There is no creation of specific wear due to additional moving parts at nozzle 43: needle valve 42 will therefore have a normal life span.
- Actuator 64 does not need to be powerful, as the pre-positionings of stop 62 are done in hidden time for longer periods than sudden changes in product output flow. In addition, positioning of stop 62 occurs while needle valve 42 is open, which does not generate stress on cam stop 62.
- Conventional needle valve 42 sealing systems may be used, and there is no need to design specific sealing systems.
- Stops 60 and 62 and actuator 64 may be adapted in the form of assembly 8 to a pre-existing application device by only providing access to needle 38 or to piston 40.

Other embodiments of the product application device are shown in FIGS. 8-11. In these embodiments, the elements common to the first embodiment bear the same references and function in the same manner.

Figure 8:
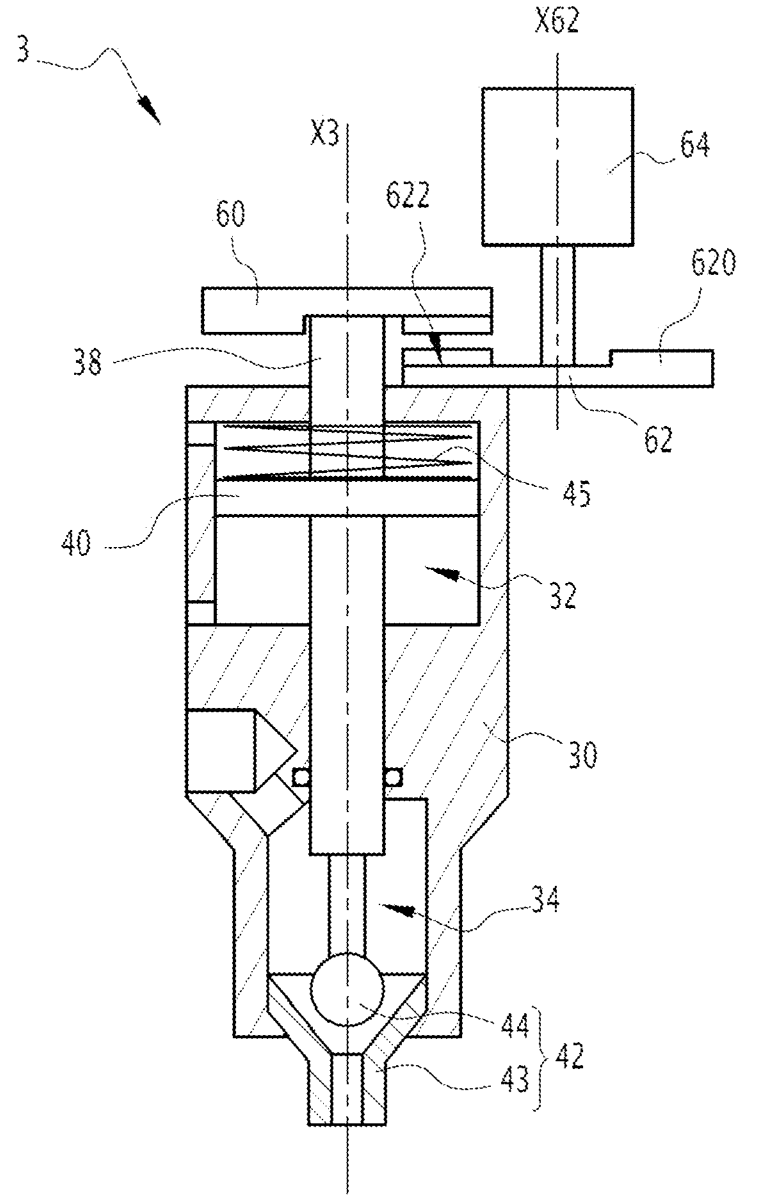
FIG. 8 is a schematic cross-section of a product application device according to a second embodiment of the invention.

A second embodiment is shown in FIG. 8. In this embodiment, the position of stop 62 fixed in relation to frame 30 is adjustable about an adjustment axis X62 parallel to longitudinal axis X3 of needle 38. The stop is formed by a cam surface 620 whose height is variable, along axis X62, based on its angular position about axis X62. On one angular portion, cam surface 620 has a step 622 of small thickness that does not prevent needle 38 from descending. On an opposite angular portion with respect to axis X62, cam surface 620 has a maximum thickness, which limits the return to the closed position of needle 38.

Figure 9:
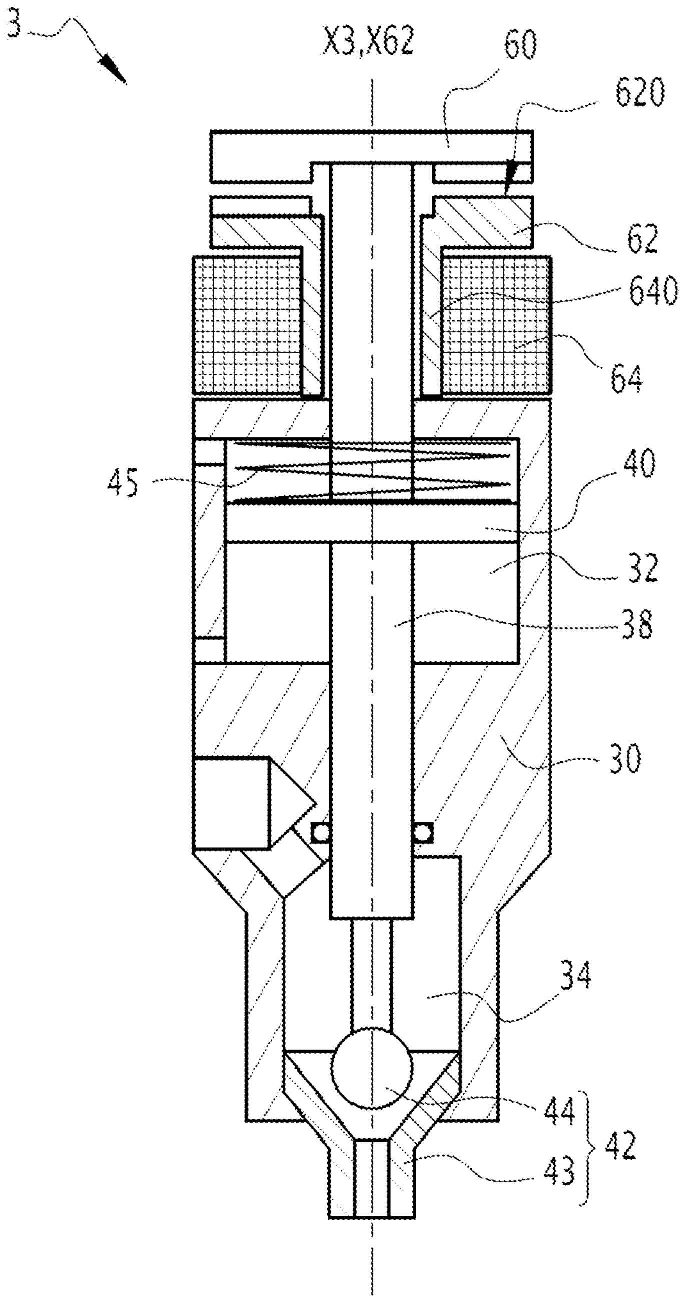
FIG. 9 is a schematic cross-section of a product application device according to a third embodiment of the invention.

A third embodiment is shown in FIG. 9. In this embodiment, actuator 64 is a hollow shaft motor forming a tubular member 640 rotatably mounted about a portion of needle 38 projecting from frame 30. Tubular member 640 carries stop 62, which has a cam surface 620 similar to the embodiment of FIG. 8. In this case, the angular position of cam surface 620 is adjustable about longitudinal axis X3 of needle 38, with adjustment axis X64 and longitudinal axis X3 coinciding. The height along longitudinal axis X3 of cam surface 620 is variable about adjustment axis X64. This embodiment ensures radial and axial compactness of application device 3.

Figure 10:
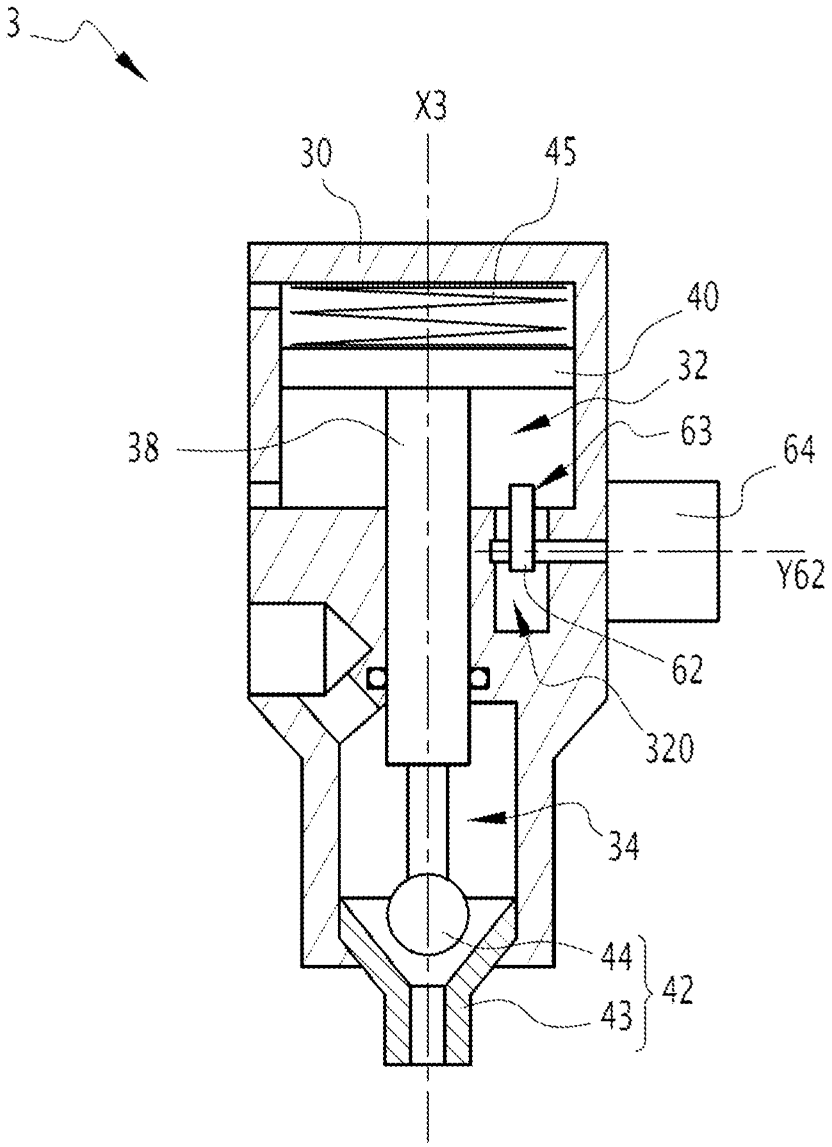
FIG. 10 is a schematic cross section of a product application device according to a fourth embodiment of the invention.

A fourth embodiment is shown in FIG. 10. In this embodiment, stop 62 fixed in relation to frame 30 is provided in control chamber 32. Cam 63 forming stop 62 is rotatable about adjustment axis Y62 oriented perpendicular to longitudinal axis X3. Cam 63 projects into control chamber 32 in such a way as to limit downward movement of piston 40. In this case, the stop fixed in relation to needle 38 is thus formed by piston 40 itself. A cavity 320 is provided in frame 30 to allow rotation of cam 63 around adjustment axis Y62.

Figure 11:
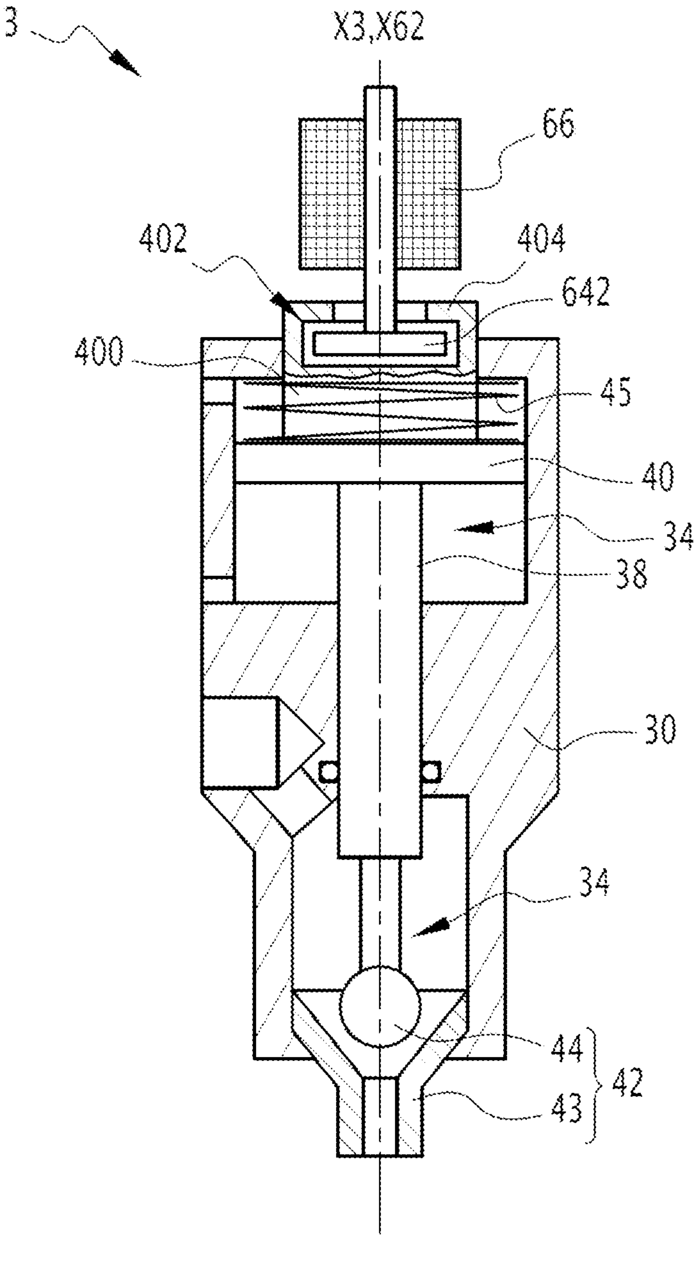
FIG. 11 is a schematic cross-section of a product application device according to a fifth embodiment of the invention.

A fifth embodiment is shown in FIG. 11. In this embodiment, the adjustment actuator is a linear actuator 66, that is, it exerts a translational movement, for example a cylinder or a ball screw. Stop 62 fixed in relation to frame 30 is formed by a part 642 movable in translation along adjustment axis X62 which is then parallel or coincident with longitudinal axis X3 of needle 38. Piston 40 includes a cylindrical part 400 extending outside of frame 30, and around which spring 45 is wound. Cylindrical portion 400 at its upper end includes a cavity 402, in which part 642 is received. Cavity 402 includes a radial portion 404 oriented inwardly, which forms stop 60 fixed in relation to needle 38. When needle 38 returns to its closed position, part 642 opposes, along longitudinal axis X3, radial portion 404 and limits closure of needle valve 42.

The technical features of the above-described embodiments and variants may be combined to form other embodiments of the invention within the scope of the claims.

The invention claimed is:

1. A device for applying a product, comprising:

a frame in which a product conduit is provided, the frame defining a longitudinal bore;

a product application valve formed by a nozzle provided on said frame;

a needle mounted in said longitudinal bore, the needle being configured so as to be moved along a longitudinal axis between a position in which said application valve is closed and a position in which said application valve is open;

a shutter provided at one end of said needle located in said product conduit;

a stop fixed in relation to said needle;

a stop fixed in relation to said frame formed by at least one cam and configured to limit the return of said needle towards its closed position to an intermediate position between the closed position and the open position, by interaction with said stop fixed in relation to said needle, wherein a position of the at least one cam is rotatably adjustable about an adjustment axis parallel to the longitudinal axis of said needle, and wherein the at least one cam thickness increases around the adjustment axis; and an actuator for adjusting the position of the at least one cam.

2. The device according to claim 1, wherein said actuator is a rotary electric motor.

3. The device according to claim 2, wherein said at least one cam is carried by a tubular part mounted around a portion of said needle projecting from said frame, wherein said actuator is a hollow shaft motor driving said tubular part, an angular position of said at least one cam being adjustable around the longitudinal axis of said needle, and wherein the at least one cam thickness increases around the adjustment axis.

* * * * *